US010132301B2

(12) United States Patent
Ruxanda et al.

(10) Patent No.: US 10,132,301 B2
(45) Date of Patent: Nov. 20, 2018

(54) COMPRESSOR AND CRANKSHAFT-CONNECTING ROD ASSEMBLY

(71) Applicant: Emerson Climate Technologies, Inc., Sidney, OH (US)

(72) Inventors: Roxana E. L. Ruxanda, Troy, OH (US); Steve Korte, Sidney, OH (US); James Leroy Cole, Sidney, OH (US); Steven James Baker, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 278 days.

(21) Appl. No.: 14/879,694

(22) Filed: Oct. 9, 2015

(65) Prior Publication Data
US 2016/0108908 A1 Apr. 21, 2016

Related U.S. Application Data

(60) Provisional application No. 62/066,008, filed on Oct. 20, 2014.

(51) Int. Cl.
*F16C 9/04* (2006.01)
*F04B 39/00* (2006.01)
*F04B 39/12* (2006.01)

(52) U.S. Cl.
CPC ...... *F04B 39/0005* (2013.01); *F04B 39/0022* (2013.01); *F04B 39/0094* (2013.01); *F04B 39/128* (2013.01); *F16C 9/04* (2013.01)

(58) Field of Classification Search
CPC .......... F04B 39/128; F04B 39/0094; F04B 39/0022; F04B 39/0005; F16C 33/06;
(Continued)

(56) References Cited

U.S. PATENT DOCUMENTS 1,756,095 A * 4/1930 Neuenfelt ............... F16C 9/04
29/898.054
1,767,882 A * 6/1930 Hammond ............... F16C 9/04
74/587
(Continued)

FOREIGN PATENT DOCUMENTS

CN 1186172 A 7/1998
CN 1699771 A 11/2005
(Continued)

OTHER PUBLICATIONS

DE102004006635A1 eSpacenet Machine Translation.*
(Continued)

*Primary Examiner* — Michael Leslie
*Assistant Examiner* — Dustin T Nguyen
(74) *Attorney, Agent, or Firm* — Harness, Dickey & Pierce, P.L.C.

(57) ABSTRACT

A compressor may include a shell, a crankshaft, a piston and a connecting rod. The shell may define a cylinder. The crankshaft is supported for rotation relative to the shell. The piston reciprocates within the cylinder in response to rotation of the crankshaft. The piston and the cylinder define a compression chamber therebetween. The connecting rod includes a first bushing rotatably coupled to the piston and a second bushing rotatably coupled to the crankshaft. The second bushing may include a driving surface contacting the crankshaft and having a recess formed therein. The recess receives an insert.

23 Claims, 4 Drawing Sheets

(58) Field of Classification Search
CPC .......... F16C 33/24; F16C 33/28; F16C 33/02;
F16C 33/04; F16C 33/046; F16C 33/08;
F16C 33/10; F16C 9/04
USPC ......... 384/95, 216, 276, 282, 285, 288, 294,
384/429, 430; 74/579 E
See application file for complete search history.

(56) References Cited

U.S. PATENT DOCUMENTS

| | | | | |
|---|---|---|---|---|
| 2,004,254 | A * | 6/1935 | Taub | F16C 9/04 384/288 |
| 2,091,451 | A * | 8/1937 | Phillips | F02B 25/00 123/198 F |
| 2,554,154 | A * | 5/1951 | Postma | F16C 3/14 184/6.5 |
| 3,482,467 | A * | 12/1969 | Volkel | F16C 7/023 74/579 R |
| 3,641,990 | A * | 2/1972 | Kinnersly | F01M 9/12 123/196 R |
| 3,739,657 | A * | 6/1973 | Patchen | F16C 7/023 74/579 E |
| 4,458,555 | A * | 7/1984 | Holtzberg | B32B 5/26 123/197.3 |
| 4,684,267 | A * | 8/1987 | Fetouh | B23D 31/003 384/294 |
| 4,930,910 | A * | 6/1990 | Mori | F16C 9/04 384/276 |
| 6,273,612 | B1 * | 8/2001 | Ono | F16C 9/04 384/276 |
| 7,437,989 | B2 | 10/2008 | Yoon et al. | |
| 7,574,795 | B2 * | 8/2009 | Ishida | B23D 31/003 225/100 |
| 7,975,806 | B2 * | 7/2011 | Glass | F16C 7/023 123/197.1 |
| 8,430,571 | B2 * | 4/2013 | Bickle | F16C 33/201 384/276 |
| 8,973,551 | B2 * | 3/2015 | Zhu | F16C 7/023 123/197.3 |
| 2003/0206671 | A1 * | 11/2003 | Vicars | F16C 9/04 384/294 |
| 2007/0227349 | A1 * | 10/2007 | Yoon | F04B 39/0022 92/140 |
| 2008/0253709 | A1 * | 10/2008 | Kikuchi | F01M 11/03 384/473 |
| 2008/0282838 | A1 * | 11/2008 | Weaver | F01M 11/02 74/579 E |
| 2012/0308168 | A1 * | 12/2012 | Watanabe | F16C 33/205 384/276 |
| 2013/0091980 | A1 * | 4/2013 | Domanchuk | F16C 9/04 74/579 E |

FOREIGN PATENT DOCUMENTS

| | | | |
|---|---|---|---|
| CN | 101094731 A | 12/2007 | |
| CN | 201944104 U | 8/2011 | |
| CN | 202273981 U | 6/2012 | |
| CN | 205172874 U | 4/2016 | |
| DE | 102004006635 A1 * | 8/2005 | ............ F16C 33/12 |
| DE | 102004006635 A1 | 8/2005 | |
| GB | 2150986 A | 7/1985 | |

OTHER PUBLICATIONS

Office Action regarding Chinese Patent Application No. 201510679375. X, dated Jun. 2, 2017. Translation provided by Unitalen Attorneys at Law.

Office Action regarding Chinese Patent Application No. 201510679375. X, dated Feb. 27, 2018. Translation provided by Unitalen Attorneys at Law.

* cited by examiner

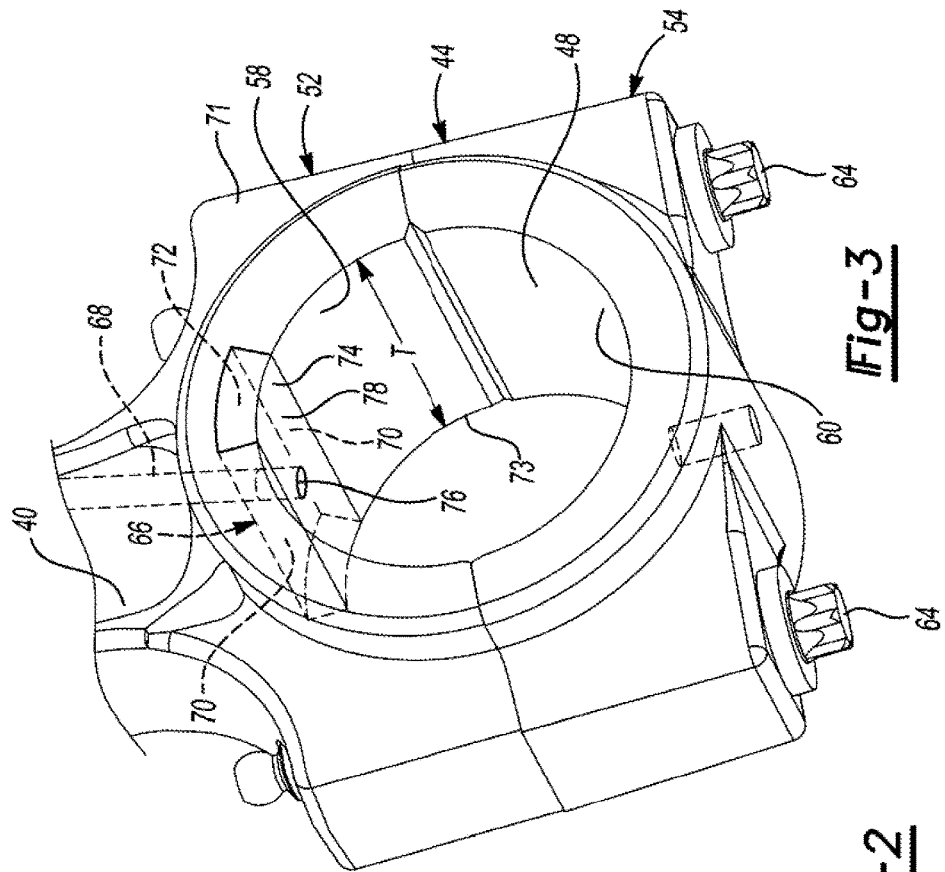
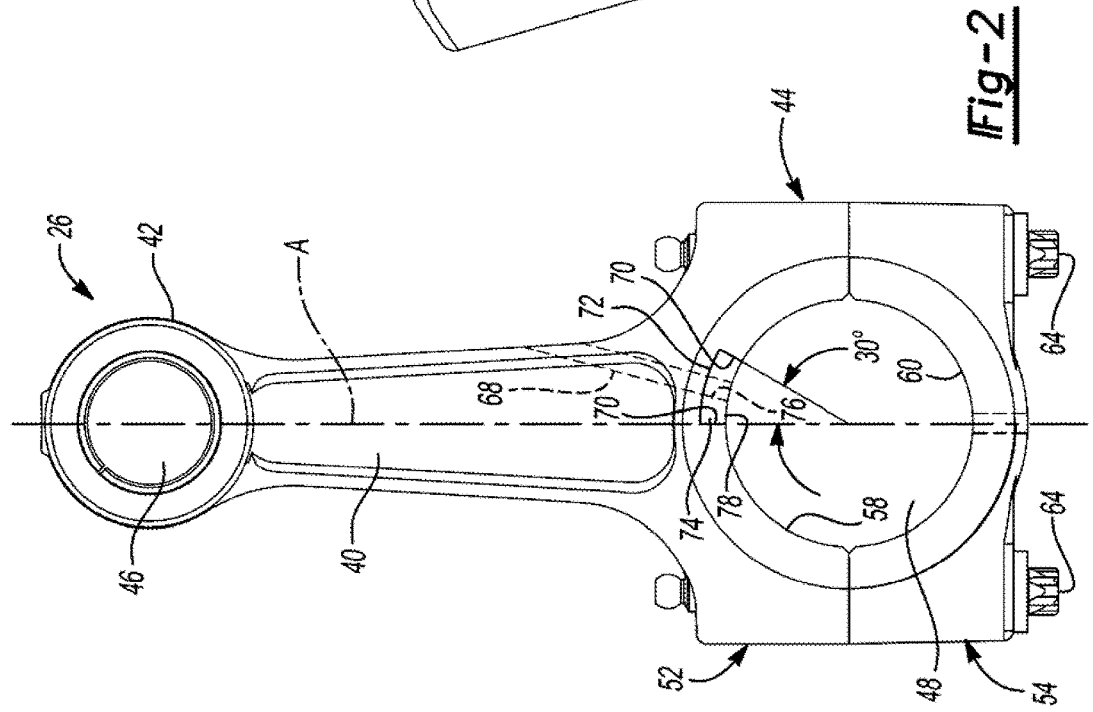

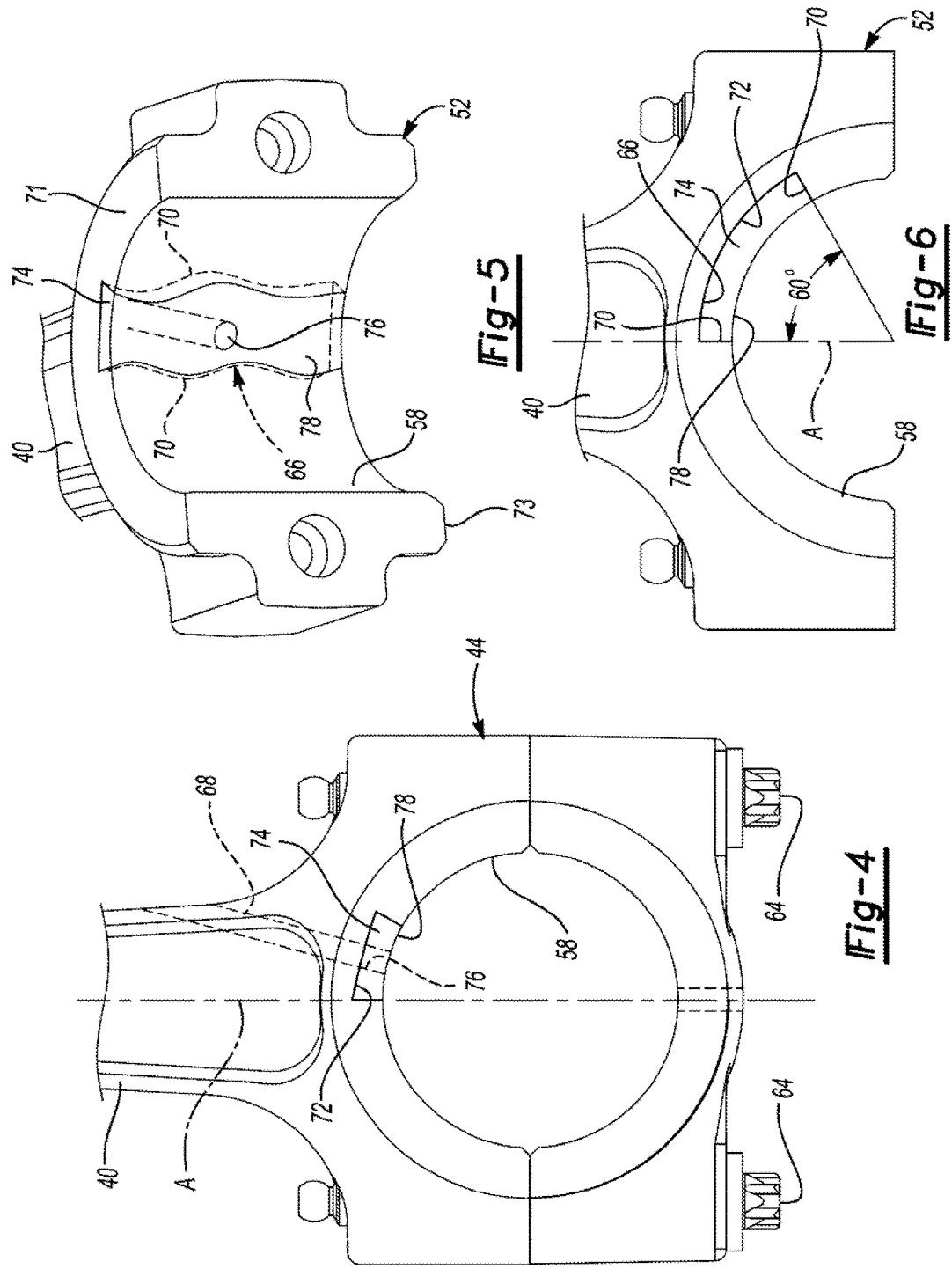

COMPRESSOR AND CRANKSHAFT-CONNECTING ROD ASSEMBLY

CROSS-REFERENCE TO RELATED APPLICATIONS

This application claims the benefit of U.S. Provisional Application No. 62/066,008, filed on Oct. 20, 2014. The entire disclosure of the above application is incorporated herein by reference.

FIELD

The present disclosure relates to a compressor, and more particularly, to a crankshaft-connecting rod assembly of a compressor.

BACKGROUND

This section provides background information related to the present disclosure and is not necessarily prior art.

Reciprocating compressors typically include a motor and one or more piston-cylinder arrangements. Operation of the motor drives a crankshaft, which imparts a force on each piston via connecting rods to move the pistons within and relative to respective cylinders. In so doing, a pressure of working fluid disposed within the cylinders is increased.

Reciprocating compressors may be used in climate control systems such as heating, ventilation, air conditioning and refrigeration systems (HVACR) to circulate a refrigerant amongst the various components of the climate control system. For example, a reciprocating compressor may receive low-pressure, gaseous refrigerant from an evaporator and compress the refrigerant to a higher pressure. The compressed refrigerant may exit the compressor and flow through a condenser to allow some or all of the refrigerant to change phase from a gas to a liquid. Thereafter, the refrigerant may be expanded via an expansion valve prior to returning to the evaporator where the cycle begins anew.

After being manufactured, compressors often sit idle (e.g., in a manufacturer's inventory or in an installation contractor's inventory) for a relatively long period of time (often several months or more) prior to being installed into and/or operated in a climate control system. Furthermore, compressors sometimes sit idle for long periods of time between periods of operation (i.e., when the climate control system is shut off for a prolonged period of time). As a result, lubricants applied to various moving components of the compressor during assembly of the compressor can, over time, drip off of various components and settle in the bottom of the compressor. Furthermore, during such prolonged idle periods, refrigerant from throughout the climate control system can migrate into the bottom of the compressor, which can hinder lubricant flow through the crankshaft at initial startup of the compressor. Therefore, a compressor that has been sitting idly for a relatively long period of time before initial installation and/or initial operation or a compressor that has been sitting idly (i.e., shutoff) for a relatively long period of time between periods of operation can have moving components that are under-lubricated (i.e., having no lubricant or not enough lubricant) at the initial startup of the compressor, which can cause damage to the compressor. For example, interfaces between the connecting rods and the crankshaft of the compressor can be particularly susceptible to such under-lubrication, which can lead to a seizure of the connecting rods and crankshaft. Such a seizure can catastrophically damage the compressor.

SUMMARY

This section provides a general summary of the disclosure, and is not a comprehensive disclosure of its full scope or all of its features.

A compressor may include a shell, a crankshaft, a piston and a connecting rod. The shell may define a cylinder. The crankshaft is supported for rotation relative to the shell. The piston reciprocates within the cylinder in response to rotation of the crankshaft. The piston and the cylinder define a compression chamber therebetween. The connecting rod includes a first bushing rotatably coupled to the piston and a second bushing rotatably coupled to the crankshaft. The second bushing may include an arched driving surface contacting the crankshaft and having a recess formed therein. The recess may receive an insert.

In some configurations, the insert is formed from a different material than the driving surface. The insert may contact the crankshaft or a piston pin.

In some configurations, the insert is formed from a material having a higher lubricity than a material of the driving surface.

In some configurations, the insert is formed from a polymeric material.

In some configurations, the insert is formed from an unleaded bearing alloy.

In some configurations, the driving surface is formed from aluminum.

In some configurations, the insert includes a first lubricant bore in fluid communication with a second lubricant bore extending through the second bushing.

In some configurations, at least a portion of the insert is aligned with a longitudinal axis of the connecting rod.

In some configurations, opposing edges of the insert are angularly spaced apart from the longitudinal axis such that the longitudinal axis extends through a central portion of the insert.

In some configurations, another portion of the insert is angularly spaced apart from the longitudinal axis by thirty degrees.

In some configurations, another portion of the insert is angularly spaced apart from the longitudinal axis by sixty degrees.

In some configurations, another portion of the insert is angularly spaced apart from the longitudinal axis by an angle between thirty and sixty degrees.

In some configurations, a surface of the insert is flush with the driving surface.

In some configurations, the insert extends through first and second opposing axial ends of the second bushing.

In some configurations, the insert engages the recess by a press fit.

In some configurations, the connecting rod can be cast around the insert.

In another form, the present disclosure provides a reciprocating compressor that includes a crankshaft, a piston reciprocating within a cylinder in response to rotation of the crankshaft, and a connecting rod. The piston and the cylinder define a compression chamber therebetween. The connecting rod includes a first bushing coupled to the piston and a second bushing coupled to the crankshaft. Each of the first and second bushings includes a driving surface that is formed of a first material. The first bushing may contact a piston pin. The second bushing may contact the crankshaft.

The driving surface of one of the first and second bushings may have a recess formed therein in which an insert is received. The insert may be formed from a second material (e.g., a high-lubricity material).

In some configurations, the insert is formed from a polymeric material.

In some configurations, the insert is formed from an unleaded bearing alloy.

In some configurations, the driving surface is formed from aluminum.

In some configurations, the insert includes a first lubricant bore in fluid communication with a second lubricant bore extending through the second bushing.

In some configurations, at least a portion of the insert is aligned with a longitudinal axis of the connecting rod.

In some configurations, opposing edges of the insert are angularly spaced apart from the longitudinal axis such that the longitudinal axis extends through a central portion of the insert.

In some configurations, another portion of the insert is angularly spaced apart from the longitudinal axis by thirty degrees.

In some configurations, another portion of the insert is angularly spaced apart from the longitudinal axis by sixty degrees.

In some configurations, another portion of the insert is angularly spaced apart from the longitudinal axis by an angle between thirty and sixty degrees.

In some configurations, a surface of the insert is flush with the driving surface.

In some configurations, the insert extends through first and second opposing axial ends of the second bushing.

In some configurations, the insert engages the recess by a press fit.

In some configurations, the connecting rod can be cast around the insert.

In another form, the present disclosure provides a compressor that may include an insert received in a recess in a surface contacting a crankshaft connected to a piston by a connecting rod. The piston reciprocates within a cylinder upon rotation of the crankshaft. The piston and cylinder define a compression chamber.

In some configurations, the surface is a driving surface of a bushing of the connecting rod.

In some configurations, the insert is flush with the driving surface.

In some configurations, the insert includes a lubricant bore.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a plan view of one of the connecting rods of FIG. 1;

FIG. 3 is a partial perspective view of the connecting rod;

FIG. 4 is a partial plan view of another connecting rod according to the principles of the present disclosure;

FIG. 5 is a partial perspective view of the connecting rod of FIG. 4;

FIG. 6 is a partial plan view of yet another connecting rod according to the principles of the present disclosure.

Corresponding reference numerals indicate corresponding parts throughout the several views of the drawings.

DETAILED DESCRIPTION

Figure 1:
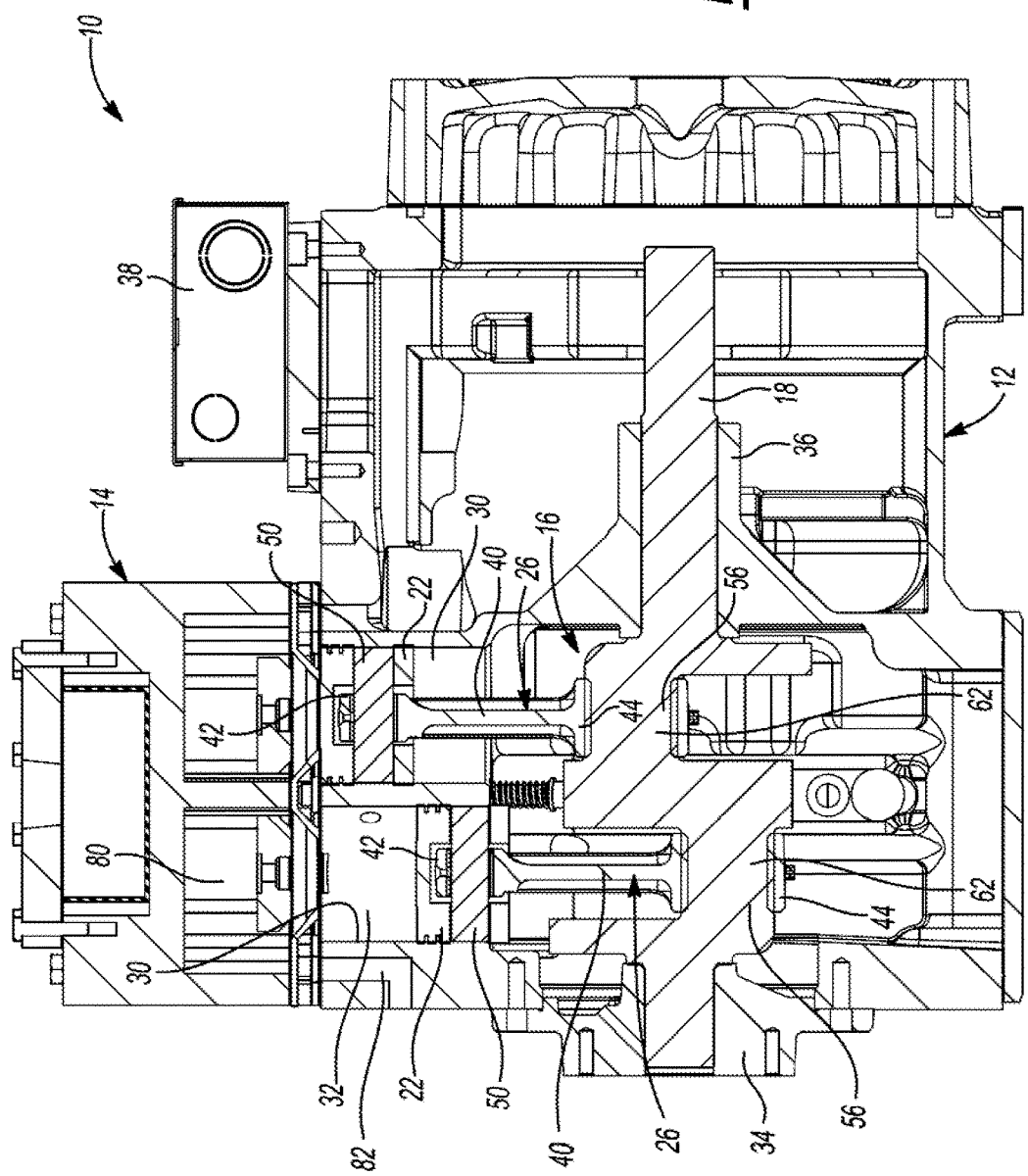
FIG. 1 is a cross-sectional view of a compressor having connecting rods according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a compressor 10 is provided that can compress a working fluid from a suction pressure to a discharge pressure to cause the working fluid to circulate amongst various components of a climate control system (e.g., a refrigeration system, an air conditioning system or a heat-pump system). The compressor 10 may be a reciprocating compressor and may include a shell 12 and a cylinder head assembly 14. The shell 12 may house a compression mechanism 16 that may include a crankshaft 18, one or more pistons 22, and one or more connecting rods 26. The shell 12 may include one or more cylinders 30 and first and second bearing housings 34, 36. The pistons 22 are reciprocatingly received in respective cylinders 30 such that compression chambers 32 are defined within the cylinders 30 between the pistons 22 and the cylinder head assembly 14. The first and second bearing housings 34, 36 rotatably support the crankshaft 18. A motor 38 may drive rotation of the crankshaft 18 relative to the shell 12. The motor 38 could be disposed inside of the shell 12 or outside of the shell 12. The crankshaft 18 can be formed from iron, steel, aluminum, titanium, or a polymeric material, for example, or any other suitable material.

Referring now to FIGS. 1-3, each of the connecting rods 26 includes a body 40, a first bushing 42 and a second bushing 44. The body 40 and the first and second bushings 42, 44 can be formed from aluminum, steel, iron, titanium, an unleaded bearing copper alloy, or a polymeric material, for example, or any suitable material. The body 40 is disposed between and interconnects the first and second bushings 42, 44. The first and second bushings 42, 44 define first and second aperture 46, 48, respectively. The first aperture 46 may have a smaller diameter than the second aperture 48. The first bushing 42 may be integrally formed with the body 40 and may rotatably engage a piston pin 50 (FIG. 1) of a corresponding piston 22.

The second bushing 44 may be formed by first and second bushing halves 52, 54. The first and second bushing halves 52, 54 include first and second arched driving surfaces 58, 60, respectively, that cooperate to define the second aperture 48 and rotatably engage a bearing journal 56 (FIG. 1) of a corresponding crank throw 62 of the crankshaft 18. The first bushing half 52 can be integrally formed with the body 40 and the first bushing 42. The second bushing half 54 can be removably fastened to the first bushing half 52 by one or more bolts 64 and/or other fasteners to selectively couple and uncouple the connecting rod 26 to the corresponding crank throw 62.

The first bushing half 52 may include a recess 66 formed in the first arched surface 58. A lubricant bore 68 may extend through a portion of the first bushing half 52 to the recess 66. In some configurations, the lubricant bore 68 may extend through a portion of the body 40 of the connecting rod 26. In some configurations, the lubricant bore 68 may extend from the first bushing 42 to the second bushing 44. In the example depicted in FIGS. 2 and 3, the recess 66 spans the entire axial thickness T of the first bushing half 52. That is, sidewalls 70 of the recess 66 can extend in an axial direction (i.e., in a direction parallel to a rotational axis of the second bushing 44) through opposing axial ends 71, 73 of the second bushing 44. In other configurations, the recess 66 could span only a portion of the axial thickness T of the first bushing half 52.

In the particular example depicted in FIGS. 2 and 3, one of the sidewalls 70 of the recess 66 may be aligned with a longitudinal axis A (FIG. 2) of the connecting rod 26 (i.e., a centerline or axis of symmetry of the connecting rod 26), and the other side wall 70 may be angularly spaced about thirty degrees (30°) apart from the longitudinal axis A. In other configurations, the positioning of either or both of the sidewalls 70 relative to the longitudinal axis A could vary from the configuration shown in FIGS. 2 and 3. That is, either of both of the side walls 70 could be angularly spaced apart from the longitudinal axis A by less than or greater than thirty degrees. For example, the configuration shown in FIG. 6 depicts the recess 66 having one sidewall 70 aligned with the longitudinal axis A and another sidewall 70 angularly spaced apart from the longitudinal axis A by sixty degrees (60°).

Figure 7:
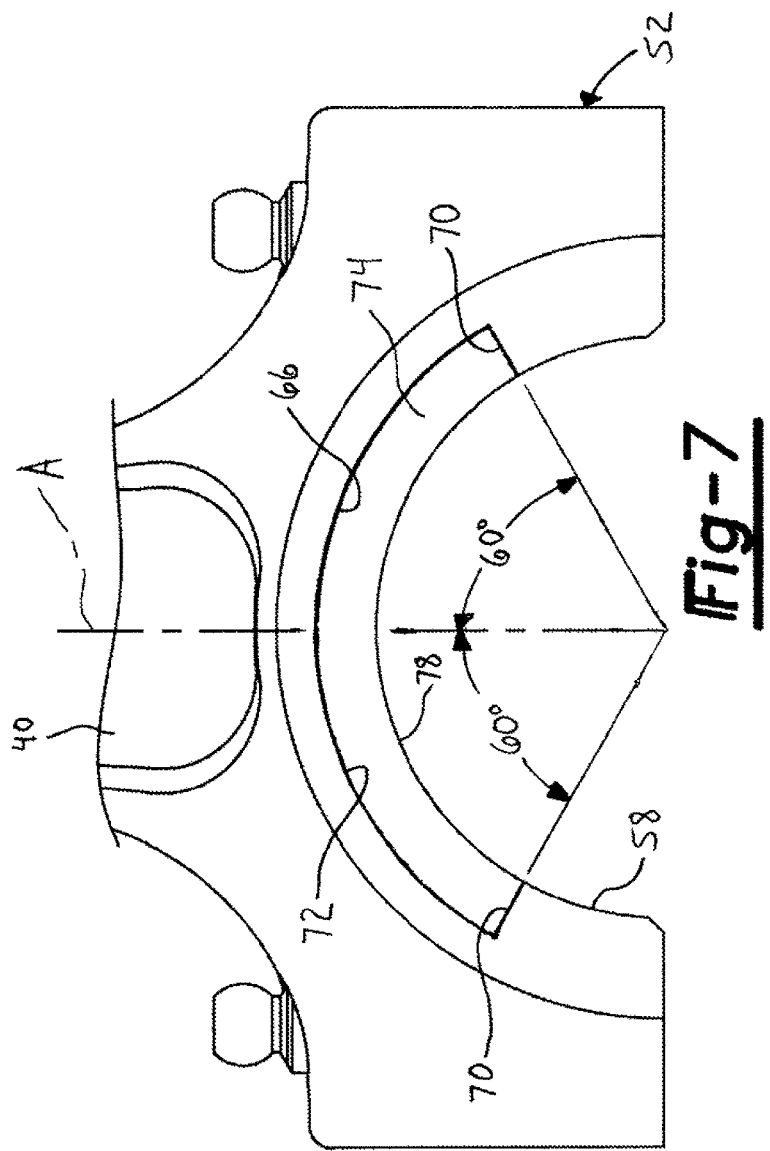
FIG. 7 is a partial plan view of yet another connecting rod according to the principles of the present disclosure.

In other examples, one sidewall 70 can be spaced apart from the longitudinal axis A by about thirty or sixty degrees (or any other suitable angle) in a first direction, and the other sidewall 70 can be spaced apart from the longitudinal axis A by about thirty or sixty degrees (or any other suitable angle) in a second direction opposite the first direction. That is, the recess 66 can be generally centered on the longitudinal axis A, as shown in FIG. 7. Such an arrangement may be particularly beneficial in three-phase compressor applications in which the crankshaft 18 can rotate in either direction depending on the operational mode of the compressor 10.

Furthermore, while the sidewalls 70 are depicted in FIGS. 2 and 3 as being planar and extending in parallel directions, in some configurations, either or both of the sidewalls 70 could have any desired shape and could extend in any desired direction. For example, FIGS. 4 and 5 illustrate an exemplary configuration in which the sidewalls 70 are curved and extend in serpentine paths. The size, shape and location of the recess 66 may be chosen to correspond to an area of the second bushing 44 that is subjected to particularly high loading during operation of the compressor 10 and/or an area of the second bushing 44 that is subject to particularly high wear forces.

An end wall 72 of the recess 66 can be a curved surface that is concentric with the first arched surface 58, as shown in FIGS. 2, 3 and 6. In other configurations, the end wall 72 can be a substantially flat, planar surface, as shown in FIGS. 4 and 5. It will be appreciated that the end wall 72 could have any other shape or configuration.

As shown in FIGS. 2-6, an insert 74 may be received in the recess 66. The insert 74 can include a lubricant bore 76 that may be aligned with and in fluid communication with the lubricant bore 68 extending through the first bushing half 52. The insert 74 can have a substantially identical complementary shape as the recess 66 in which the insert 74 is received. In some configurations, the shape of the insert 74 can vary from that of the recess 66. The insert 74 can be shaped and sized for a press fit or interference fit with the recess 66. Additionally or alternatively, the insert 74 could be adhesively bonded within the recess 66. A bearing surface 78 of the insert 74 can have the same radius of curvature as the first and second arched surfaces 58, 60 so that when the insert 74 is fully installed in the recess, the bearing surface 78 of the insert is flush with the first arched surface 58. The insert 74 can be formed from a material having a high lubricity relative to the material(s) of the rest of the second bushing 44. For example, the insert 74 can be formed from a polymeric material (including polymeric materials with or without reinforcement and/or with or without anti-wear additive, or polymer composites containing anti-wear and/or lubricating additives such as fibrous materials, ZnS, $CaF_2$, graphite, PTFE or $MoS_2$, for example), a metallic material (e.g., an unleaded metallic bearing alloy or any other alloy having suitable lubricity), a composite material, or any suitable high lubricious, solid material. In some configurations, the insert 74 can be formed from a thermoplastic or thermoset resin. In some configurations, the material of the insert 74 may or may not have lubricating additives and/or reinforcement additives.

Exemplary heat-resistant thermoplastic resins may include but are not limited to those from the polyaryletherketone (PAEK) family (such as polyaryletherketone (PAEK), polyetherketone (PEK), Polyetheretherketone (PEEK), polyetheretheretherketone (PEEEK), polyetherketoneketone (PEKK), polyetheretherketoneketone (PEEKK), polyetherketoneetheretherketone (PEKEEK), polyetheretherketoneetheretherketone (PEEKEK), and combinations thereof), polyphenylene sulfide (PPS), and Polyphthalamide (PPA). Exemplary heat resistant thermoset resins may include, but are not limited to, polyimide (PI), polyamideimide (PAI), polyester, vinylester, and epoxy resins. Exemplary lubricating additives may include, but are not limited to, graphite, graphene, molybdenum disulfide (MoS2), polytetrafluoroethylene (PTFE), tungsten disulfide (WS2), hexagonal boron nitride, carbon nanotubes, carbon fiber, polybenzimidazole, and combinations thereof. Exemplary reinforcement additives may include, but are not limited to, glass fiber, carbon fiber, aramid fiber, and combinations thereof. In some configurations, the inserts 74 may be formed from polyimide (PI) containing graphite (e.g., DuPont Vespel SP21).

In some configurations, the connecting rod 26 can be cast or molded around the insert 74, thereby locking the insert 74 into the recess 66. That is, the insert 74 can be placed on or in a die-casting or molding tool (not shown) so that the connecting rod 26 can be cast around the insert 74. The insert 74 could include one or more pins or protrusions (not shown) that can act as locking features and engage and/or extend into the end wall 72 of the recess 66.

The high lubricity of the inserts 74 of the connecting rods 26 provides sufficient local lubricity between the second bushings 44 and the journals 56 of the crankshaft 18 at immediately following a first, initial startup of the compressor 10 after manufacturing or following an extended period (e.g., several months or more) during which the compressor 10 was not operating. That is, the high lubricity of the inserts 74 provides enough local lubricity between the second bushings 44 and the journals 56 at the highest loadbearing portions of the second bushings 44 to preventing binding or seizure of the connecting rods 26 until a normal flow of lubricant can be established through operation of the compressor 10. Thereafter, the normal flow of lubricant caused by operation of the compressor 10 will provide additional lubrication between the second bushings 44 and the journals 56. Additionally, the high lubricity of the insert 74 and the positioning of the insert at a location subjected to the highest loading and wear can increase the lifecycle of the connecting rods 26 and reduce wear on the connecting rods 26 and crankshaft 18.

While the examples provided above include the recess 66 and insert 74 being in the first bushing half 52 of the second bushing 44, the connecting rods 26 could additionally or alternatively include one or more recesses and inserts in the second bushing half 54 and/or in the first bushing 42, for example. Furthermore, in some configurations, the first bushing half 52 could include multiple recesses and inserts. In some configurations, the connecting rods 26 could be one-piece connecting rods (i.e., the first and second bushing halves 52, 54 could be integrally formed as a single piece.

In some configurations, the insert 74 could be received in a recess in an bushing that is a discrete component from the body 40 and/or formed from a different material than the body 40 (i.e., the insert could be received in a recess in a driving surface of a bushing that is received within bushing 42 or 44).

Referring again to FIG. 1, operation of the compressor 10 will be described. Rotary motion of the crankshaft 18 (caused by operation of the motor 38) is transmitted to the pistons 22 by the connecting rods 26, thereby causing the pistons 22 to reciprocate within the cylinders 30. In the particular configuration shown in FIG. 1, the pair of pistons 22 reciprocate out-of-phase with each other in linearly alternating directions as the crankshaft 18 rotates.

Working fluid enters the cylinders 30 during suction strokes of the corresponding pistons 22 (i.e., when the pistons 22 move from a top-dead-center (TDC) position to a bottom-dead-center (BDC) position). When a particular piston 22 is at the TDC position, the crankshaft 18 may rotate approximately one-hundred-eighty degrees (180°) to move the particular piston 22 into the BDC position, thereby causing the piston 22 to move from a location proximate to a top portion of the particular cylinder 30 adjacent the cylinder head assembly 14 to a bottom portion of the cylinder 30 spaced apart from the cylinder head assembly 14. When one of the pistons 22 is moved into the BDC position from the TDC position, the compression chamber 32 corresponding to that piston 22 is placed under a vacuum, which causes suction-pressure working fluid to be drawn into the corresponding cylinder 30.

When the piston 22 travel toward the TDC position, the effective volume of the compression chamber 32 is reduced, thereby compressing the working fluid disposed within the compression chamber 32. At or near the TDC position, the working fluid may exit the cylinders 30 and enter a discharge chamber 80 in the cylinder head assembly 14. From the discharge chamber 80, the working fluid may be expelled from the compressor 10 through a discharge port 82 in the shell 12, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor comprising:
a shell defining a cylinder;
a crankshaft supported for rotation relative to said shell;
a piston reciprocating within said cylinder in response to rotation of said crankshaft, said piston and said cylinder defining a compression chamber therebetween; and
a connecting rod including a first bushing rotatably coupled to said piston and a second bushing rotatably coupled to said crankshaft, said second bushing including a driving surface contacting said crankshaft and having a recess formed therein, said recess receiving an insert,
wherein said insert extends through first and second opposing axial ends of said second bushing,
wherein said connecting rod includes a longitudinal axis that extends through said first and second bushings, wherein said longitudinal axis defines a centerline of said connecting rod, and
wherein said longitudinal axis extends through said insert such that a first sidewall of said insert is angularly spaced apart from said longitudinal axis by thirty to sixty degrees and a second sidewall of said insert is angularly spaced apart from said longitudinal axis by thirty to sixty degrees, and wherein said longitudinal axis is disposed angularly between said first and second sidewalls.

2. The compressor of claim 1, wherein said insert contacts said crankshaft.

3. The compressor of claim 1, wherein said insert is formed from a different material than said driving surface.

4. The compressor of claim 3, wherein said insert is formed from a material having a higher lubricity than a material of said driving surface.

5. The compressor of claim 4, wherein said insert is formed from a polymeric material.

6. The compressor of claim 4, wherein said insert is formed from an unleaded bearing alloy.

7. The compressor of claim 1, wherein said insert includes a first lubricant bore in fluid communication with a second lubricant bore extending through said second bushing.

8. The compressor of claim 7, wherein said first and second lubricant bores are angled relative to said longitudinal axis of said connecting rod.

9. The compressor of claim 1, wherein a surface of said insert is flush with said driving surface.

10. The compressor of claim 1, wherein the connecting rod is cast around the insert.

11. A reciprocating compressor comprising a crankshaft, a piston reciprocating within a cylinder in response to rotation of said crankshaft, and a connecting rod, said piston and said cylinder defining a compression chamber therebetween, said connecting rod including a first bushing coupled to said piston and a second bushing coupled to said crankshaft, said first and second bushings each including a driving surface formed of a first material, said first bushing contacting a piston pin, said second bushing contacting said crankshaft, said driving surface of one of said first and second bushings having a recess formed therein in which an insert is received, said insert being formed from a second material,
wherein said insert extends through first and second opposing axial ends of said one of said first and second bushings,
wherein said connecting rod includes a longitudinal axis that extends through said first and second bushings, wherein said longitudinal axis defines a centerline of said connecting rod, and
wherein said longitudinal axis extends through said insert such that a first sidewall of said insert is angularly spaced apart from said longitudinal axis by thirty to sixty degrees and a second sidewall of said insert is angularly spaced apart from said longitudinal axis by thirty to sixty degrees, and wherein said longitudinal axis is disposed angularly between said first and second sidewalls.

12. The reciprocating compressor of claim 11, wherein said insert is formed from a material including an additive selected from the group consisting of: ZnS, CaF$_2$, graphite, PTFE and MoS$_2$.

13. The reciprocating compressor of claim 11, wherein a surface of said insert is flush with said driving surface.

14. The reciprocating compressor of claim 11, wherein the connecting rod is cast around the insert.

15. The reciprocating compressor of claim 11, wherein said insert includes a first lubricant bore in fluid communication with a second lubricant bore extending through said second bushing, and wherein said first and second lubricant bores are angled relative to said longitudinal axis of the connecting rod.

16. A compressor comprising:
a shell defining a cylinder;
a crankshaft supported for rotation relative to said shell;
a piston reciprocating within said cylinder in response to rotation of said crankshaft, said piston and said cylinder defining a compression chamber therebetween; and
a connecting rod including a first bushing rotatably coupled to said piston and a second bushing rotatably coupled to said crankshaft, said second bushing including a driving surface contacting said crankshaft and having a recess formed therein, said recess receiving an insert,
wherein said insert extends through first and second opposing axial ends of said second bushing, and
wherein a sidewall of said insert is aligned with a longitudinal axis at a centerline of said connecting rod, and wherein another sidewall of said insert is angularly spaced apart from said longitudinal axis by an angle between thirty and sixty degrees.

17. The compressor of claim 16, wherein said insert is formed from a material having a higher lubricity than a material of said driving surface.

18. The compressor of claim 16, wherein said insert includes a first lubricant bore in fluid communication with a second lubricant bore extending through said second bushing, and wherein said first and second lubricant bores are angled relative to said longitudinal axis of said connecting rod.

19. A reciprocating compressor comprising a crankshaft, a piston reciprocating within a cylinder in response to rotation of said crankshaft, and a connecting rod, said piston and said cylinder defining a compression chamber therebetween, said connecting rod including a first bushing coupled to said piston and a second bushing coupled to said crankshaft, said first and second bushings each including a driving surface formed of a first material, said first bushing contacting a piston pin, said second bushing contacting said crankshaft, said driving surface of one of said first and second bushings having a recess formed therein in which an insert is received, said insert being formed from a second material,
wherein said insert extends through first and second opposing axial ends of said one of said first and second bushings, and
wherein a sidewall of said insert is aligned with a longitudinal axis at a centerline of said connecting rod, and wherein another sidewall of said insert is angularly spaced apart from said longitudinal axis by an angle between thirty and sixty degrees.

20. The reciprocating compressor of claim 19, wherein said insert is formed from a material including an additive selected from the group consisting of: ZnS, $CaF_2$, graphite, PTFE and $MoS_2$.

21. The reciprocating compressor of claim 19, wherein a surface of said insert is flush with said driving surface.

22. The reciprocating compressor of claim 19, wherein the connecting rod is cast around the insert.

23. The reciprocating compressor of claim 19, wherein said insert includes a first lubricant bore in fluid communication with a second lubricant bore extending through said second bushing, and wherein said first and second lubricant bores are angled relative to said longitudinal axis of the connecting rod.

* * * * *